(12) United States Patent
Green

(10) Patent No.: US 6,522,472 B1
(45) Date of Patent: Feb. 18, 2003

(54) APPARATUS FOR DISPLAYING A REAL IMAGE IN SPACE

(75) Inventor: Ian Mcdonald Green, London (GB)

(73) Assignee: Central Research Laboratories Limited, Hayes (GB)

( * ) Notice: Subject to any disclaimer, the term of this patent is extended or adjusted under 35 U.S.C. 154(b) by 0 days.

(21) Appl. No.: 09/936,657

(22) PCT Filed: Mar. 17, 2000

(86) PCT No.: PCT/GB00/00999

§ 371 (c)(1),
(2), (4) Date: Sep. 14, 2001

(87) PCT Pub. No.: WO00/55834

PCT Pub. Date: Sep. 21, 2000

(30) Foreign Application Priority Data

Mar. 17, 1999 (GB) .............................................. 9906193

(51) Int. Cl.⁷ .............................................. G02B 27/10
(52) U.S. Cl. ...................................... 359/630; 359/629
(58) Field of Search ................................ 359/619, 621, 359/624, 629, 630, 633, 471, 477, 479; 353/10, 31, 37

(56) References Cited

U.S. PATENT DOCUMENTS

| | | | |
|---|---|---|---|
| 3,772,507 A | 11/1973 | Hills | |
| 4,613,128 A | 9/1986 | Lasky | |
| 5,140,460 A | * 8/1992 | Fukuhara et al. | ........... 359/445 |
| 5,726,806 A | 3/1998 | Holden et al. | |
| 5,764,411 A | 6/1998 | Shanks | |
| 5,993,006 A | * 11/1999 | Takeuchi et al. | .............. 353/30 |
| 6,204,973 B1 | 3/2001 | Holden | |

FOREIGN PATENT DOCUMENTS

| | | |
|---|---|---|
| CH | 679342 A5 | 1/1992 |
| EP | 0 793 840 B | 4/1997 |

* cited by examiner

Primary Examiner—Georgia Epps
Assistant Examiner—Saeed Seyrafi
(74) Attorney, Agent, or Firm—Martin Fleit; Paul D. Bianco; Fleit Kain Gibbons Gutman & Bongini

(57) ABSTRACT

An apparatus for displaying an image in space and for providing a background image behind the projected image having an image generator and optical system for projecting an image of an object in an image plane suspended in space. A partially light-transmissive screen is located between the image generator and optical system and the projected image. The screen contains a pattern of juxtaposed light-transmissive regions, through which the image is projected, and regions which are not light-transmissive (ie, substantially opaque areas or reflective surfaces). The background image is printed, or painted, on the opaque areas on the side of the screen remote from the image generator optical system. The screen may be made by printing the background image on opaque areas on a translucent or transparent film, or by printing the background image on a foraminated or perforated opaque sheet.

10 Claims, 2 Drawing Sheets

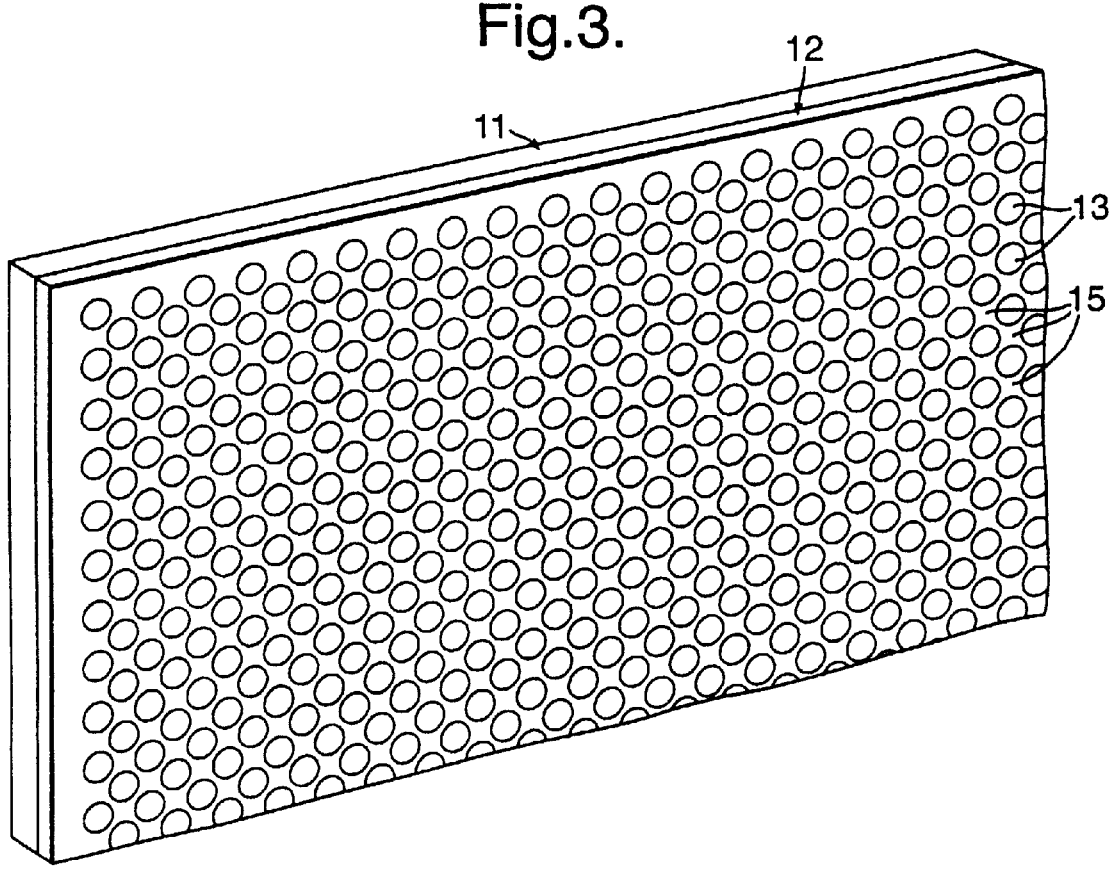

APPARATUS FOR DISPLAYING A REAL IMAGE IN SPACE

This invention relates to image display apparatus and in particular not exclusively to apparatus for producing three-dimensional images or a holograph suspended in space.

Examples of prior known 3D image display devices are shown in our British Patents Nos 2,306,885, 2,292,248 and 2,287,549 and European Patent Nos 734,541 and 460,873 and International Application Publication No WO 98/37450.

An object of the present invention is to provide apparatus for generating and projecting an image into space.

The invention as claimed enables much clearer images to be projected by reducing the extraneous light from the light source and its image generator optics, that would otherwise "dilute" the projected image, by projecting the image through a partially light-transmissive screen. It also gives more realistic and more definitive image set against an appropriate background.

The present invention will now be described, by way of example, with reference to the accompanying drawings in which:

FIG. 3 illustrates a partially light-transmissive screen for use with the apparatus of FIGS. 1 and 2.

Figure 1:
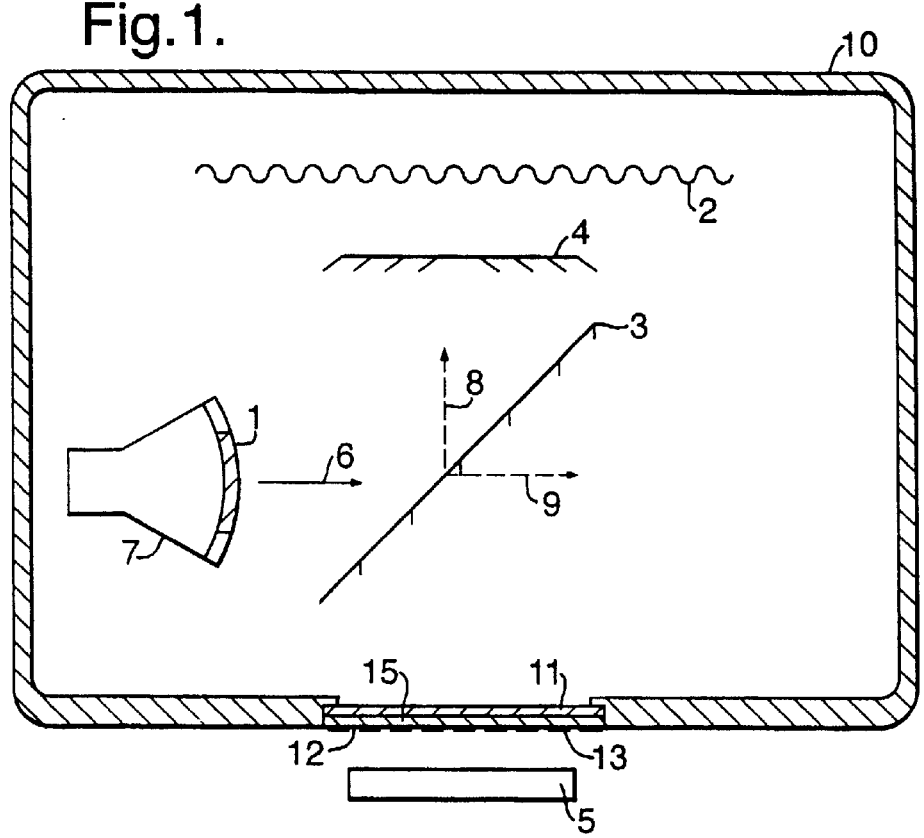
FIGS. 1 and 2 illustrate schematically apparatus constructed in accordance with two embodiments of the present invention.

Referring to FIG. 1, there is shown an apparatus for generating a three dimensional image. The apparatus is basically similar to that described in our International Patent Application Publication No WO 98/37450 with the addition of a partially light-transmissive screen (11). The apparatus comprises an object (1) for display; a retroreflector (2) arranged to receive light from the object and a beamsplitter (3) located in the path of light from the object (1) to the retroreflector (2). The beamsplitter (3) is arranged at an oblique angle to the direction of propagation (6) of the light such that it transmits part of the light (9) and reflects part of the light (8). The light which is transmitted or reflected by the beamsplitter (3) is received by the retroreflector (2), and is reflected by it back to the beamsplitter (3) which either reflects or transmits part of this retroreflected light to form a real image (5) suspended in space. The apparatus comprises a converging optical element, which in the present example is a lens (4), arranged between the beamsplitter (3) and the retroreflector (2) so that light from the beamsplitter (3) passes through the lens (4) to the retroreflector (2) which reflects it back through the lens (4) towards the beamsplitter (3).

In the present embodiment, the object 1 comprises an image displayed by a visual display unit 7, and the retroreflector 2 comprises a sheet of bead type retroreflective material. In an alternative embodiment, an illuminated solid object may be used in place of the image 15 displayed on the visual display unit 7. As a further alternative, the retroreflective material may comprise a sheet of a comer cube retroreflecting material or a triple mirror retroreflector or other direction selective screen.

The retroreflector (2), the object (1), the visual display unit (7) (or the light source for illuminating the object (1)) are all mounted within a housing (10) which is provided with a partially light-transmissive screen (11) through which the image is projected.

The term "partially light-transmissive screen" as used herein, is taken to mean a screen that comprises a pattern of juxtaposed light-transmissive regions, through which the image is projected, and regions which are not light-transmissive. The pattern may be a random pattern or a uniform pattern.

The light-transmissive regions are translucent or transparent to light; the regions which are not light-transmissive are substantially opaque materials or reflective surfaces.

The screen (11) may be in the form of a self-supporting transparent or translucent sheet of plastics material, such as a polycarbonate, or it could be made of glass, to which is attached a flexible transparent film (12) of PVC, on which is printed a pattern of opaque areas (13) (see FIG. 3). A suitable printed film material is available from Contra Vision Limited. The opaque areas (13) may be printed or painted, and may be of a uniform colour to form a unicolour background or may have a picture on them, so that together, when viewed from the front, they portray a background to the projected image in the form of a picture, scene or advertising material.

Alternatively, the screen (11) may be made of an opaque material, such as for example a plastics sheet or film that is foraminated, or perforated with a tessellation of apertures through which the image (5) is projected. Such a screen effectively defines an opaque area (13) with light transparent regions (15) formed by the apertures.

Figure 2:
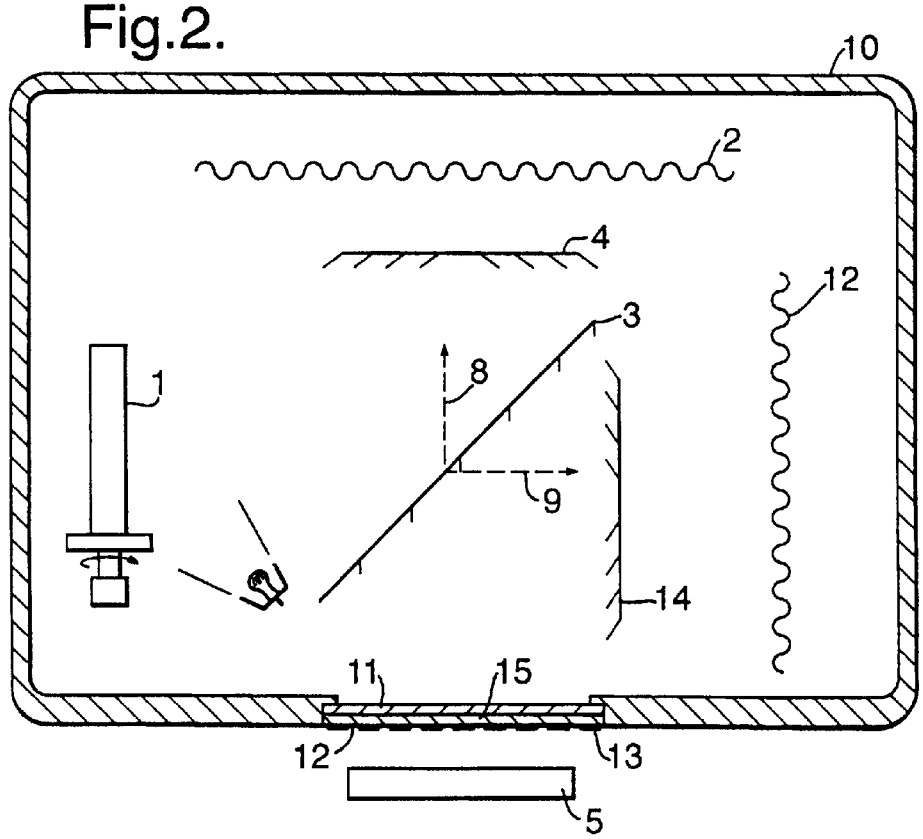

The screen (11) need not be a self-supporting substrate to which a film (12) is attached (as shown in FIG. 1). It could simply be a thin transparent film (12), such as a plastics film on which a pattern of opaque areas (13) (see FIG. 3) is printed. In this case, the thin transparent film (12) could be self-supporting, or one which is not self-supporting. In the latter case, the film (12) would be mounted in a frame (not shown) at its periphery and held in tension in the frame. The frame would be attached to the housing (10), to position the film at the location where the screen (11) is shown in FIGS. 1 and 2.

In an alternative construction of the screen (11), the screen (11) may comprise a sheet of opaque material such as paper, cardboard, or a plastics film (eg PVC) that is foraminated, or perforated with a tessellation of apertures through which the image is projected.

In an alternative construction, the screen (11) may be formed of an opaque material such as a textile fabric material which may be woven, knitted, or non woven, in which the spacing between the warp and the weft threads (or the whales and courses of knitted stitches) define the transparent or translucent areas (15) whilst the background is printed on the opaque textile fabric. One suitable form of textile material is that which is used as a sunblind for automobile use. In the case of a textile material, the textile material may be used on its own, for example by stretching it across a frame, or it may be fixed to a transparent or translucent plastic or glass substrate.

In one example, the scene printed or painted on the opaque areas (13) forms a background relevant to the projected image (5) that is to be displayed. In another example, the opaque areas define a bland opaque background, which is in contrast to the image (5) to be displayed so that the image (5).stands out from the background.

In a further example, selected opaque areas (13), of the screen (1) may be printed with a picture, scene or advertising material, and selected opaque areas (13) over printed with a second picture or advertising logo, which is printed in a reflective ink, or retroreflective material. In this way, in ambient daylight a first background image is portrayed as a background to the projected image and when illuminated from the front with a different light source, the second background image or advertising logo is portrayed.

The three dimensional image to be displayed is projected through the "apertures" in the screen defined by the light-transmissive regions (15) between the opaque region, or regions, (13). The opaque region, or regions, (13) block out extraneous light from the light source and the optic system (1, 2, 3, 4, 5, 7) which generates the projected image, and a person viewing the projected image (5) from in front of the screen (11) sees only the projected image (5) set against the background which is printed on the opaque areas (13) of the screen.

In a second embodiment of the invention, as shown in FIG. 3, the image generator optics system comprises a pair of sheets of retroreflecting material (2, 12), and respective converging lenses (4, 14) are arranged between the beamsplitter (3) and each retroreflector (2). This arrangement reduces the amount of light lost and therefore increases the apparent brightness of the suspended image. The presence of a second retroreflector is advantageous even if the second converging lens (14) were removed from this embodiment, as the suspended image (5) would appear to be brighter than in the first embodiment and almost as clear.

It is believed that the reason that the presence of a converging optical element, such as the lens (14) is so advantageous is that, contrary to simple theory, a ray of light incident on a retroreflector will not be returned precisely along the direction from which it came, because of diffraction, manufacturing tolerances, translational shifts, or other causes of imperfect retroreflection. As a result the incident ray becomes a narrow cone of light after retroreflection. If one places a converging lens in the path of this cone of light it will behave as if it had originated at a point source, and the lens will bring the cone of light to a focus. If the lens (4, 14) is positioned such that it forms an image of the object at the surface of the retroreflector (2), then the point at which the same lens (4, 14) will form an image of the point source from this cone of retroreflective light will coincide with the position of the original object, or where a beamsplitter diverts the light at the position of the suspended image. The result of the presence of the lens is a dramatic sharpening of the suspended image. The improvement is such that bead retroreflectors (which do not retroreflect perfectly and so usually give rise to poor quality suspended images) can be used to form suspended images showing resolutions of television quality.

In addition, because light from the object (1) is being focused on to a retroreflective material, a reduced area of retroreflective sheet is required. Hence smaller (cheaper) systems can be produced for a given viewing angle, or a greater viewing angle can be achieved with a given retroreflective area. Larger "seamless" images may be produced from a single retroreflective "tile" of a given size.

The converging optical elements (4, 14) employed in the embodiment shown in FIGS. 1 and 2 are Fresnel lenses, but conventional converging lenses can be used instead. Fresnel lenses have the advantage of being lighter in weight and cheap to manufacture.

Any spacing between the converging lens and the retroreflector are within the scope of the present invention. However, suspended images having the best resolution are formed when the optical distances between the object and the lens, and between the lens and the retroreflector, are selected such that the converging lens produces an image of the object at the surface of the retroreflector.

In the embodiment of FIG. 2, the image generator optics (retroreflectors 2, 12, lenses 4, 14, beamsplitter 3 and object 1) are all located inside a housing 10 which is provided with a partially light-transmissive screen 11 as described above in connection with FIG. 1.

In the embodiments described above, the film (12) is printed or painted with spaced opaque areas (13) leaving light-transmissive (translucent or transparent) areas (15) between the opaque areas (13) through which the projected image is displayed. In an alternative embodiment, the film (12) may be printed or painted with a scene or picture which has regions which are relatively more translucent than the rest of the scene or picture, through which the image is projected. This latter embodiment may result in slight diminution of the quality of the projected image due to attenuation of the light.

In the embodiment described above the non-light-transmissive, or opaque areas (13) are formed by a plurality of closely spaced dots printed or painted on a plastic sheet or a sheet of glass. Alternatively, the opaque area (13) may be formed by spaced lines or formed from a large opaque area in which "apertures" or windows are cut to define the light-transmissive regions (15) through which the projected image is directed.

The illuminated object 1 may be a static object or it may be a moving object. For example, the object may be mounted on a rotating turntable. The image 13 displayed on the visual display unit 7 may be a static image or an animated image, for example a video clip or cartoon.

What is claimed is:

1. Apparatus for displaying an image suspended in space comprising an image generator, an optical system for projecting the image in an image plane, and a partially light-transmissive screen located between the image generator and the image plane, said screen having a background image formed on non-light-transmissive regions on that side of the screen which, in use, is remote from the image generator so as to form a background to the projected image.

2. Apparatus according to claim 1 wherein the screen comprises a light-transmissive material on which is formed a plurality of spaced non-light-transmissive areas on which the background image is formed so that the projected image is projected through the light-transmissive regions of the screen.

3. Apparatus according to claim 1 wherein the screen comprises a sheet of light-transmissive material on which is formed a matrix array of opaque dots, and the dots together define a background image when viewed from the side of the sheet which, in use, is remote from the image generator.

4. Apparatus according to claim 1 wherein the background is printed on opaque areas on the screen.

5. Apparatus according to claim 1 wherein the screen comprises a sheet of opaque material having light-transmissive regions through which the image is projected.

6. Apparatus according to claim 5 wherein the opaque material is a plastics material.

7. Apparatus according to claim 5 wherein the opaque material is a textile fabric.

8. Apparatus according to claim 7 wherein the fabric is woven fabric and light-transmissive regions are constituted by the spaces between the warp and weft threads of the fabric.

9. Apparatus according to claim 7 wherein the fabric is a non-woven fabric and the light-transmissive regions are constituted by apertures formed in the fabric.

10. Apparatus according to claim 1 wherein the sheet comprises a sheet of reflective material having light-transmissive regions through which the image is projected.

* * * * *